United States Patent [19]
Hopf

[11] Patent Number: 4,867,463
[45] Date of Patent: Sep. 19, 1989

[54] QUICK RELEASE COLLET

[75] Inventor: Werner G. Hopf, San Marcos, Calif.

[73] Assignee: Eaton Leonard Technologies, Inc., Carlsbad, Calif.

[21] Appl. No.: 240,081

[22] Filed: Sep. 2, 1988

[51] Int. Cl.$^4$ .............................................. B23B 31/20
[52] U.S. Cl. .................................. 279/46 R; 279/50; 279/55; 279/57
[58] Field of Search ....................... 279/41 R, 41 A, 42, 279/43, 46 R, 46 A, 47–59

[56] References Cited

U.S. PATENT DOCUMENTS

| 1,946,629 | 2/1934 | Laughlin | 279/51 |
|---|---|---|---|
| 2,018,452 | 10/1935 | Laughlin | 279/51 |
| 2,219,008 | 10/1940 | Orissner | 279/46 R |
| 2,291,397 | 7/1942 | Martin | 279/51 |
| 2,291,398 | 7/1942 | Martin | 279/51 |
| 2,363,889 | 11/1944 | Martin | 29/61 |
| 2,382,060 | 8/1945 | Ingalls | 279/51 |
| 2,407,083 | 9/1946 | Koppel | 279/74 |
| 2,433,230 | 12/1947 | Martin | 279/51 |
| 2,551,077 | 5/1951 | Wilson | 279/46 |
| 2,681,808 | 6/1954 | O'Connell | 279/41 |
| 2,821,404 | 1/1958 | Sloan | 279/51 |
| 3,385,607 | 5/1968 | Hughes | 279/51 |
| 4,193,607 | 3/1980 | Pearson | 279/1 |
| 4,214,766 | 7/1980 | Rall et al. | 279/46 R |
| 4,251,084 | 2/1981 | Franklin | 279/55 X |
| 4,309,041 | 1/1982 | Peterson et al. | 279/55 X |
| 4,768,269 | 9/1988 | Williams | 279/46 R X |

Primary Examiner—Steven C. Bishop
Attorney, Agent, or Firm—Gausewitz, Carr & Rothenberg

[57] ABSTRACT

A pipe holding collet is provided with an insert assembly that can be readily and quickly changed without the use of tools so as to adapt the collet to hold tubes of different sizes. The insert assembly is formed of a number of identical longitudinally separate segments, radially urged outwardly by compression springs and held together in a unitary assembly by a segment encircling retainer ring. The radially contractible and expandable assembly is releasably held within the bore of a master collet by means of an interengaging circumferential groove on the inner surfaces of the master collet fingers and circumferential ribs on the outer surfaces of the insert segments.

13 Claims, 4 Drawing Sheets

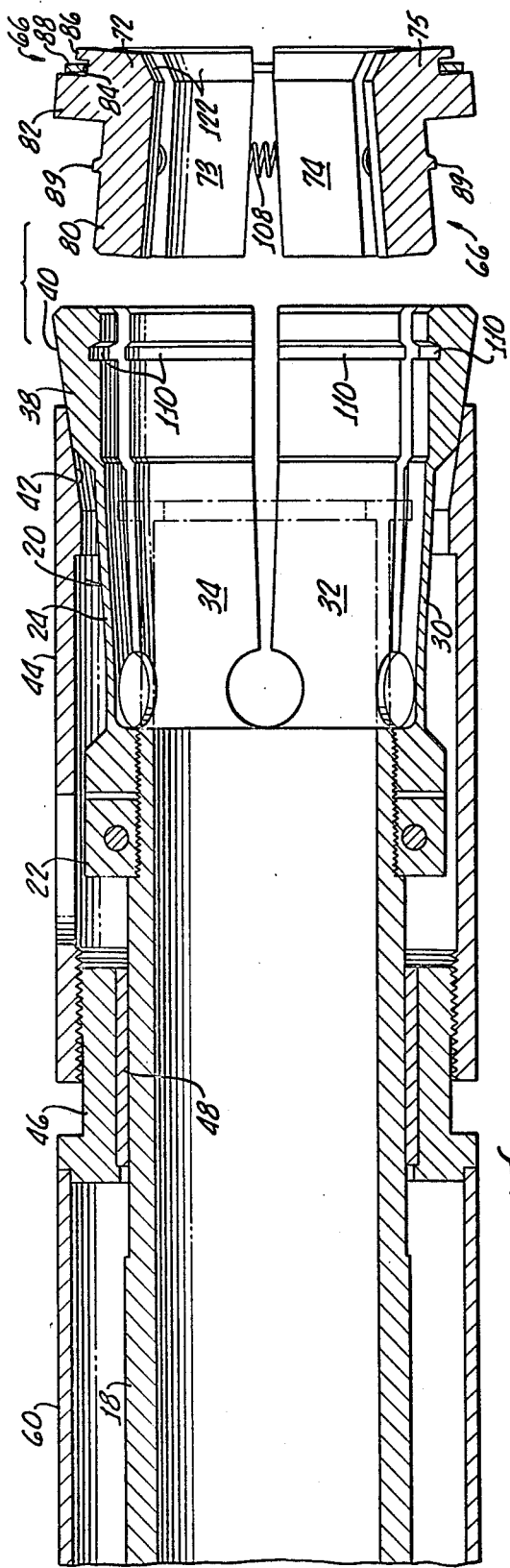

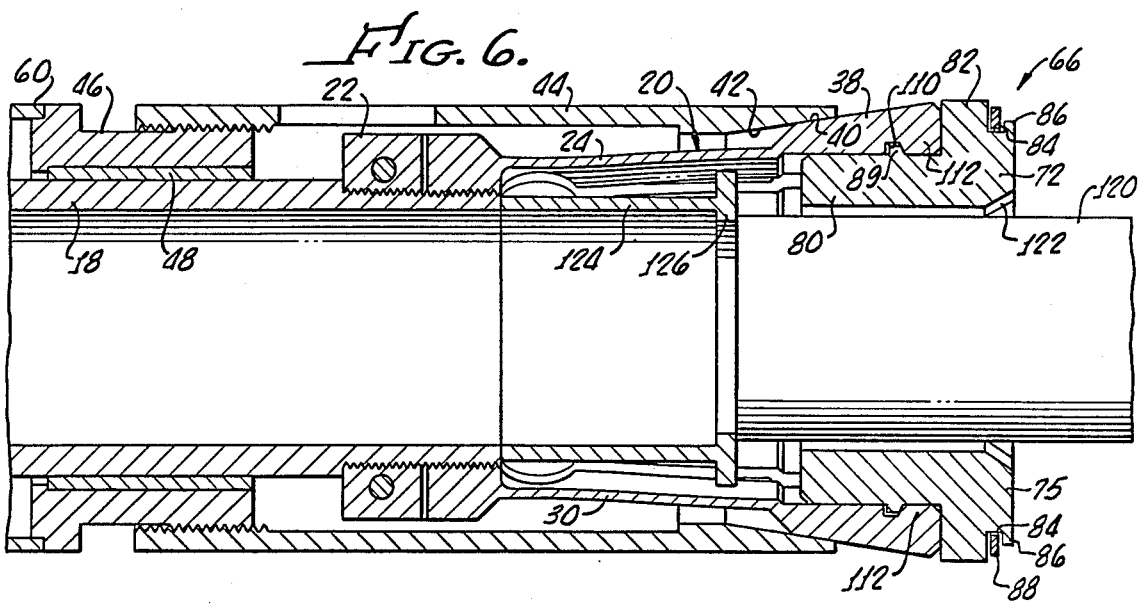
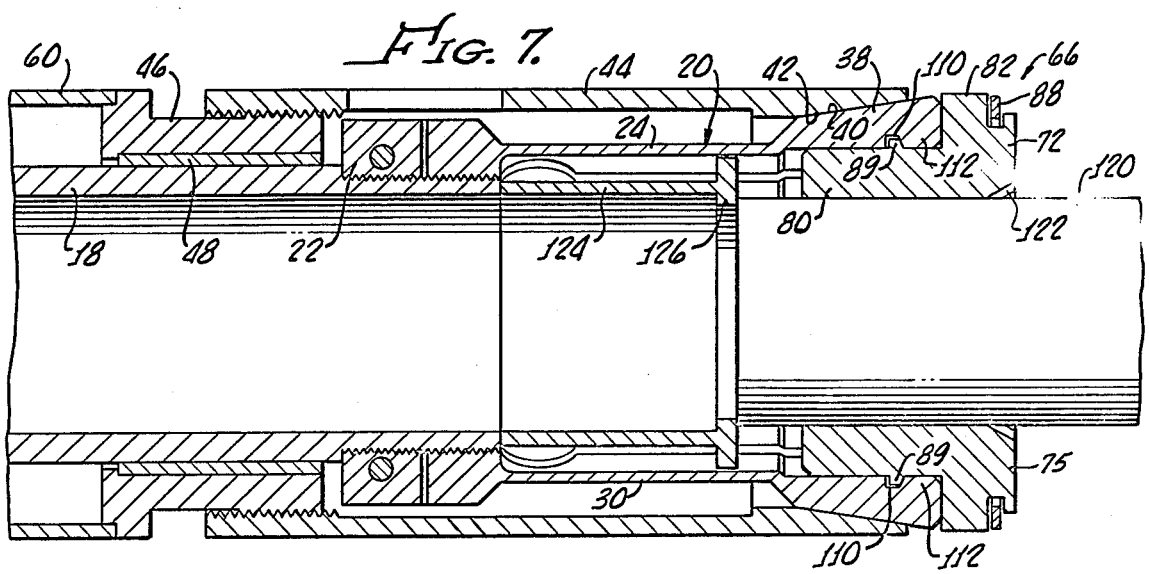
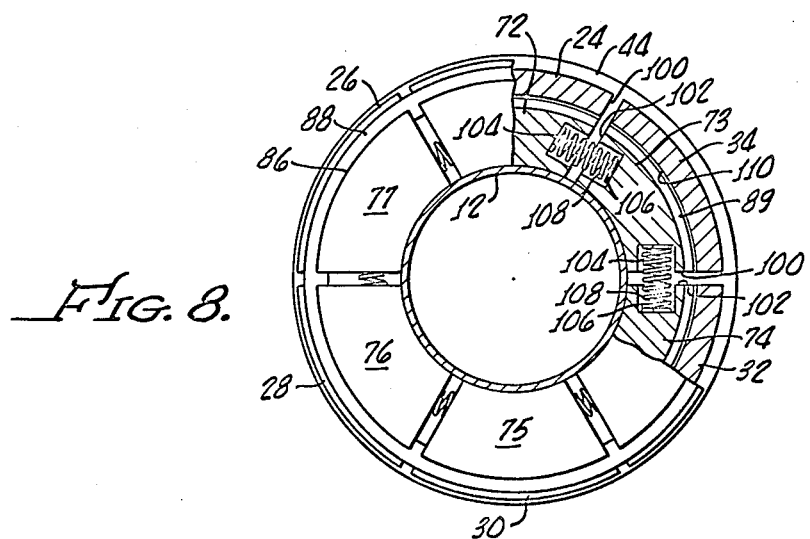

QUICK RELEASE COLLET

BACKGROUND OF THE INVENTION:

In the handling of pipes, tubes, rods and other elongated members, a collet or chuck provided on the apparatus is called upon to firmly grasp tubes of different diameters. The collet grasps the tube by employing collet fingers that are radially inwardly compressed against the outer surface of the tube. In order to limit the amount of radial inward travel required of the collet fingers, inserts of varying thickness are used. This effectively enables the tube grasping bore of the collet to have different diameters from which the radial inward contraction begins.

Inserts have been employed in the past which require individual insertion and individual connection, as by means of bolts, for example, to the collet fingers. Such arrangements are undesirable because the time required for making a change. For example, in one arrangement in which individual collet inserts for an automatic pipe bending machine are employed, the separate segments must be individually connected and bolted in place, requiring as much as one minute and one-half for assembly and nearly one minute for removal. Moreover, once removed, the separate collet segments and their bolts must be stored as individual elements on the tool storage shelf and must be individually handled and manipulated for insertion and removal. The time required and the required use of tools for frequent changes of such collet are undesirable in the operation of many machines, such as pipe bending machines, for example.

Accordingly, it is an object of the present invention to provide a collet having a quick change insert assembly that avoids or minimizes problems of the prior art.

SUMMARY OF THE INVENTION:

In carrying out principles of the present invention in accordance with a preferred embodiment thereof, an insert assembly is detachably received in a bore of a master collet which has a plurality of fingers that define the bore. The insert assembly comprises a plurality of insert segments having means connected with the segments for urging radial expansion of the assembly and means independent of the master collet for limiting radial expansion of the segments. Means are provided for releasably securing the assembly within the bore so that the insert segments can be inserted into and removed from the bore as a unit and remain interconnected as a unit while not positioned within the bore. According to a feature of the invention, the insert assembly, when inserted into the bore of the master collet, itself has a pipe grasping bore that is larger in diameter than the diameter of a pipe to be grasped, so that such a pipe can be inserted into and removed from the insert assembly in released condition without drag or friction on the pipe. Radial expansion of the insert segments and their radial contraction to grasp a pipe are enabled by use of resilient members interconnecting adjacent segments with one another without interfering with either the internal or external surface of the insert assembly.

BRIEF DESCRIPTION OF THE DRAWINGS:

FIG. 3 is an enlarged sectional view of the master collet with the insert assembly displaced from the master collet and about to be assembled;

FIG. 4 is a front elevational view, with parts broken away, of the arrangement of FIG. 3;

FIG. 5 is a view similar to FIG. 3 showing the insert assembly partly inserted;

FIG. 6 is a sectional view showing the master collet expanded with a pipe inserted but not clamped in the insert assembly;

FIG. 7 is a sectional view showing the collet and insert assembly in position clamping a pipe held in the collet FIG. 8 is a front view of the apparatus of FIG. 7;

Figure 1:
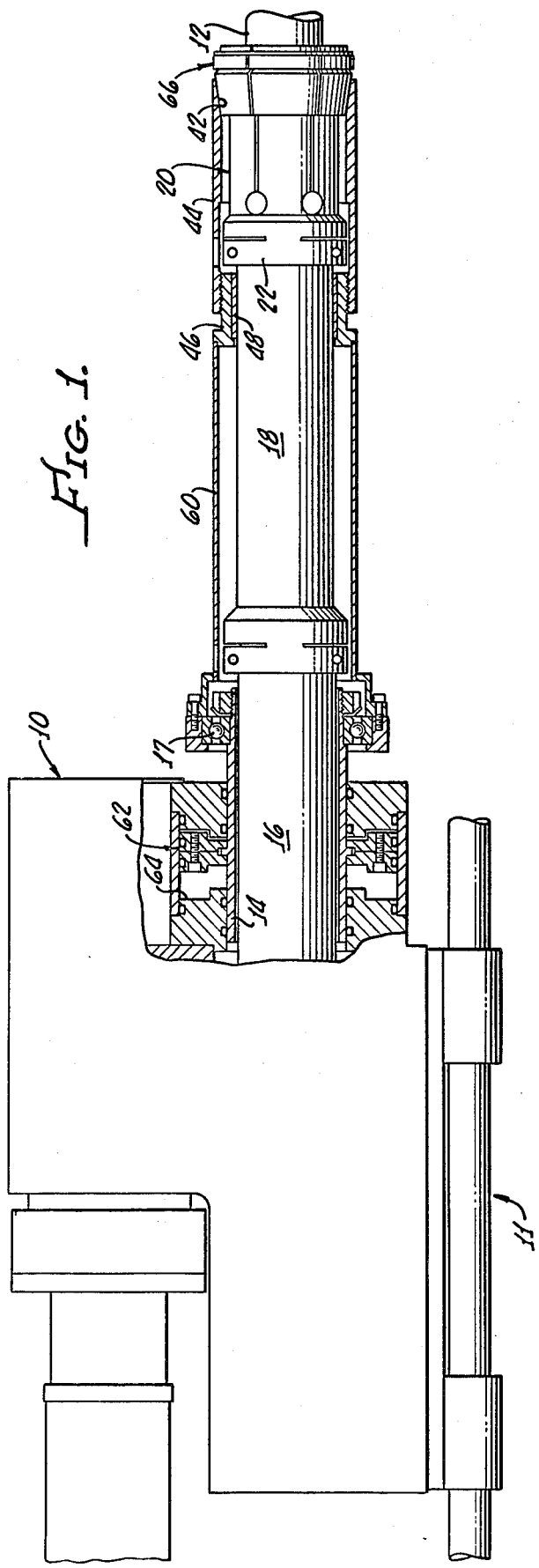
FIG. 1 is a side elevation view, with parts shown in section, of a portion of the carriage of a pipe bending machine, showing the collet grasping a pipe.

DETAILED DESCRIPTION OF THE PREFERRED EMBODIMENT:

Illustrated in FIG. 1 is a portion of a pipe bending machine, such as, for example, the machine shown in U.S. Pat. No. 4,269,054 for Bending Method of Homer L. Eaton, issued May 26, 1981, assigned to the assignee of the present application. Such a bending machine includes a carriage generally indicated at 10, which is mounted for slidable motion on a machine bed 11 for grasping and moving pipe 12 toward a bending head having a set of bending dies (not shown). The carriage has a nonrotatable sliding sleeve 14 which is rotatably coupled to a hollow inner tube 16 on a bearing 17. Tube 16 fixedly carries an adapter tube 18 extending forwardly beyond the carriage and mounting at its forward end a master collet generally indicated at 20. The master collet comprises an enlarged rear collar 22 fixedly secured to the forward end of hollow adapter tube 18 and having a plurality of split, longitudinally separated, resilient fingers 24,26,28,30,32 and 34, each terminating in an enlarged tapered head, such as head 38 of finger 24. The enlarged head of each finger has an exterior surface, such as surface 40, tapered rearwardly and inwardly for cooperation with a mating tapered surface 42 on a tubular collet housing 44 that is fixed at its inner end to a connector drive sleeve 46. Sleeve 46 retains a sliding bearing 48 sliding on the outer surface of the adapter tube 18. Connector sleeve 4 is fixed to the forward end of a hollow drive shaft 60 that is rotatably connected at its inner end via bearings 17 to the nonrotatable slidable sleeve 14. Slidable motion of sleeve 14 is accomplished by a drive piston 62 mounted for axial slidable motion in a cylinder 64 carried on the carriage. Introduction of air under pressure into cylinder 64 on one side or the other of piston 62 will effect a longitudinal drive of collet housing 44 by means of the slidable sleeve 14, slidable collet drive shaft 60, and connector sleeve 46. Tube 16, and therefore the entire collet, is rotated by a mechanism (not shown) to achieve rotation of a pipe grasped in the collet for control of the plane of bend.

Figure 2:
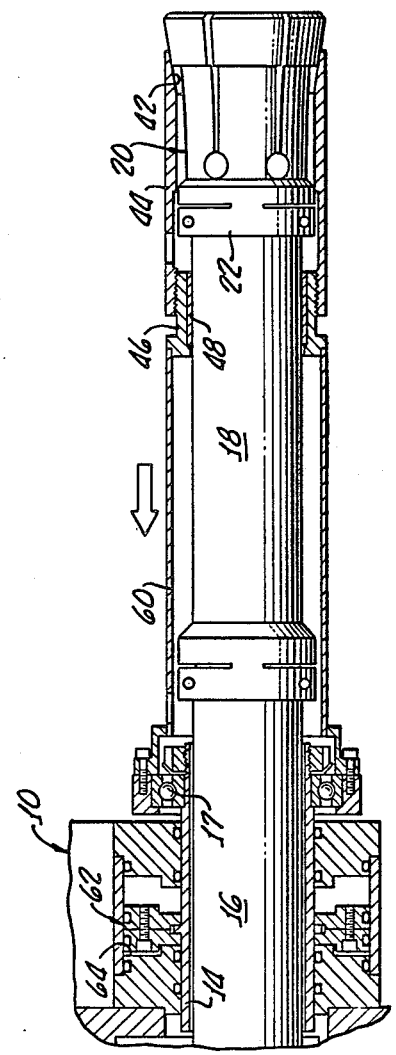
FIG. 2 is a view similar to FIG. 1 showing the master collet in open position with the pipe and inserts removed.

In the position shown in FIG. 1, piston 62 has been driven forwardly to drive the collet housing 44 forwardly, thereby radially compressing the master collet fingers to grasp a pipe 12 in the collet through a collet insert assembly 66, to be described in detail below. FIG. 2 illustrates the collet in released position, with the pipe removed, showing the drive piston 62 in its rear position with the collet housing tube 44 retracted to allow the resilient master collet fingers to expand outwardly to a radially enlarged release position.

Figure 11:
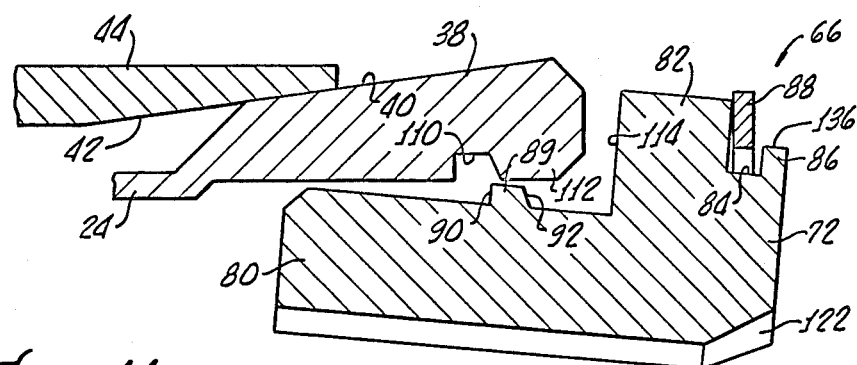
FIG. 11 is an enlarged view showing the relation of an insert segment and a master collet finger in the course of removal of the insert.

To enable the master collet 20 to employ a short radially inward contracting stroke for grasping an inserted pipe, and to still be able to handle a variety of pipes of a significantly different range of diameters, a number of insert assemblies 66 are provided, each assembly having the same effective outer diameter but having a different inner diameter to accommodate a different pipe size. All such assemblies are identical to one another except for a difference in thickness of individual segments, and, therefore a difference in effective pipe grasping bore. One such assembly, indicated at 66, is illustrated in FIGS. 3 and 5 and comprises six precisely identical collet segments, such as segments 72,73,74,75, 76 and 77. Each segment has an elongated rear body portion, such as body portion 80 of segment 72, a radially outwardly projecting front flange 82 extending circumferentially for the circumferential length of the segment, and a circumferentially extending outwardly facing recess 84 formed in a front portion of the flange and defined in part by the flange 82 and in part by a radially shorter forward wall 86. Each segment also has a radially outwardly projecting circumferentially extending rib segment 89, having a substantially radial rear wall 90 and a sloping forward face 92, as best seen in FIG. 11.

Each segment has longitudinally extending side faces lying in substantially radially extending planes, the faces being designated by numerals 100 and 102 for adjacent segments 72 and 73 in FIG. 4. In each of these adjacent radially extending faces of each collet segment is formed a circular recess, such as recesses 104,106 for segments 72,73, which recesses extend tangentially of the assembled collet. Each mating pair of mutually aligned and mutually opposed recesses 104,106 receives and retains a compression spring 108, there being six identical springs 108 captured in the six pairs of mating mutually aligned recesses in opposite pairs of faces of adjacent segments (see FIG. 4). The compression springs 108 exert outward tangentially directed forces on adjacent segments, tending to spread the segments apart. The net effect of the spring forces is an outwardly directed radial spring force on each segment, tending to move each segment outwardly along a radius of the assembly. To hold all six segments in a assembled condition, a relatively thin, somewhat flexible but fixed diameter retaining ring 88 is positioned and captured within the recesses 84 of the front flanges 82 of the several segments. The thickness of the retaining ring 88 (as measured in a direction axially of the collet) is considerably less than the corresponding thickness of recess 84 to allow each segment to be tilted relative to the retaining ring, as shown, for example, in FIG. 3. The compression springs 108, being positioned about half way back of the front face of the insert segments, urge rearward portions of each of the segments radially outwardly. However, since the front portions of the segments are restricted in radial outward motion by the retaining ring 88, each segment tends to pivot about the retaining ring as a fulcrum when urged by the springs 108 and when not otherwise restrained.

The master collet fingers are each formed with a inwardly facing groove 110 extending circumferentially for the circumferential length of the individual master collet head and having a configuration matching the configuration of the segment ribs 89 but having dimensions slightly larger than the dimensions of the ribs. As can be seen in FIG. 7, the tapered forward faces of the segment ribs 89 and corresponding tapered forward faces of master collet finger recesses 110 engage each other when the master collet is radially inwardly compressed. The parts are dimensioned so that, in the closed pipe grasping position of FIG. 7, the forward portion 112 of the master collet finger head is a snug fit between the forward face 92 of the segment rib and the rear face 114 of segment flange 82 (FIG. 11).

It will be seen that the insert assembly is a complete assembly of mutually interconnected identical segments, connected in assembled relation by a combination of the six captured compression springs and the encircling retaining ring 88. The segments are urged radially outwardly by the springs, but the springs do not interfere with either the smooth interior pipe grasping bore formed by the six segments collectively, nor with the exterior surface of the segment assembly which mates with the interior surface of the master collet fingers. Although the interconnection of the several segments by the combination of springs and retainer hold all of the segments permanently in assembled condition, the arrangement allows a significant amount of relative motion of the several segments, including radial expansion and contraction, a small amount of relative axial motion of individual segments relative to the others, and tilting action. As will be understood from the description below, all of these relative motions are employed in operation of the collet, whether for insertion, removal or grasping a pipe.

When contracted radially, as by squeezing the several insert segments between the fingers of an operator to compress all springs, the diameter of the outer circumference of the insert assembly, as measured along the outermost surface of the several segment ribs 89, is smaller than the inner diameter of the master collet fingers, when the latter are expanded to a position in which they are held by the collet housing tube 44 in its retracted position (as shown in FIG. 6). With this arrangement, and with tube 44 retracted to allow the master collet fingers to open, when the collet segments are squeezed together by the operators fingers, the collet may be inserted into the bore defined by the master collet fingers, as shown in FIG. 5. With the collet segments squeezed together and pressed inwardly of the master collet fingers (toward the left as viewed in FIG. 5) the collet segments may have their rearward portions tilted inwardly, as shown in FIG. 5, allowing the assembly of inserts to slide into the master collet bore until the ribs 89 enter the grooves 110. Contact occurs between the front inclined faces of the ribs and the collet grooves as the ribs enter the grooves, and thus the collet segments are held in a slightly radially contracted position (see FIG. 6). In the position of FIG. 6 the segments are urged outwardly by the compression springs, and the mutually facing side edges of adjacent collets are spaced from each other to permit radial contraction for grasping a pipe. In this slightly radially contracted position, with the collet housing drive tube 44 still retracted, a pipe 120 may be inserted into the bore formed by the collet segments, which have a tapered entrance formed by chamfers 122 on the front inner edges of each of the segments. The pipe is readily inserted into the insert assembly bore, which, in the position of FIG. 6, is larger in diameter than the pipe outer diameter, to allow free insertion and withdrawal of the pipe, without any drag.

If deemed necessary or desirable, a pipe stop in the form of a short cylindrical sleeve 124, having a short radially inwardly projecting front stop flange 126, is inserted into the master collet fingers before insertion of the insert assembly. The pipe stop abuts the end of adapter 18 to enable proper positioning of an end of a pipe within the collet.

With the pipe in position, as shown in FIG. 6, piston 62 (see FIG. 1) is driven forwardly to the position of FIG. 1 to cause the forward inclined surface 42 of collet housing 44 to ride up over the mating inclined outer surface 40 of the master collet finger heads 38, thereby driving the collet fingers, and concomitantly the insert segments, radially inwardly to firmly clamp a pipe in the insert assembly bore. This clamped position is illustrated in FIG. 7. FIG. 8 is a front view with parts broken away of the collet closed and clamped upon a pipe.

Figure 9:
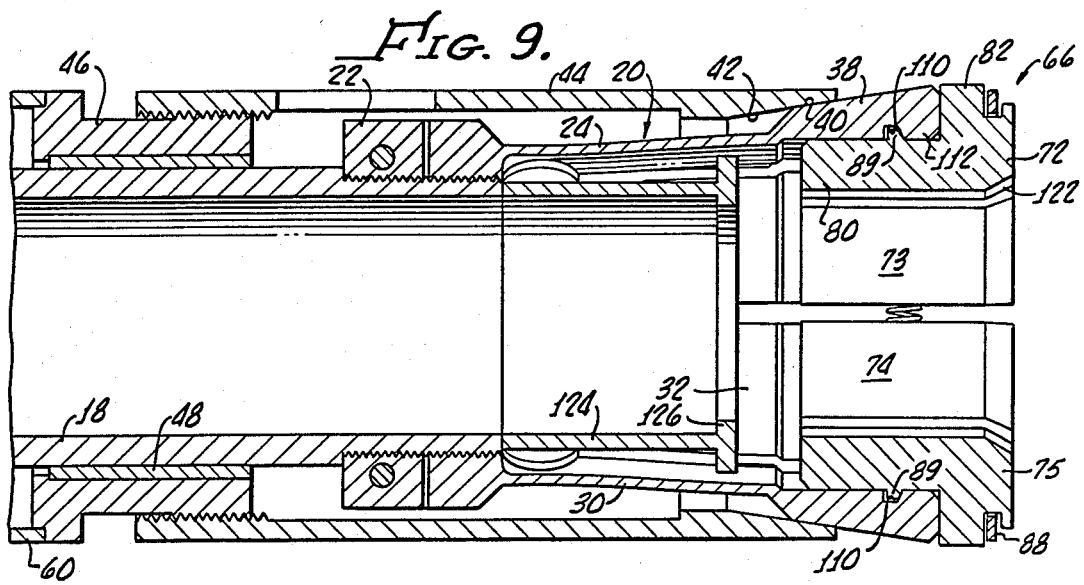
FIG. 9 is a view of the collet assembly like that of FIG. 6 but with the pipe removed.
Figure 10:
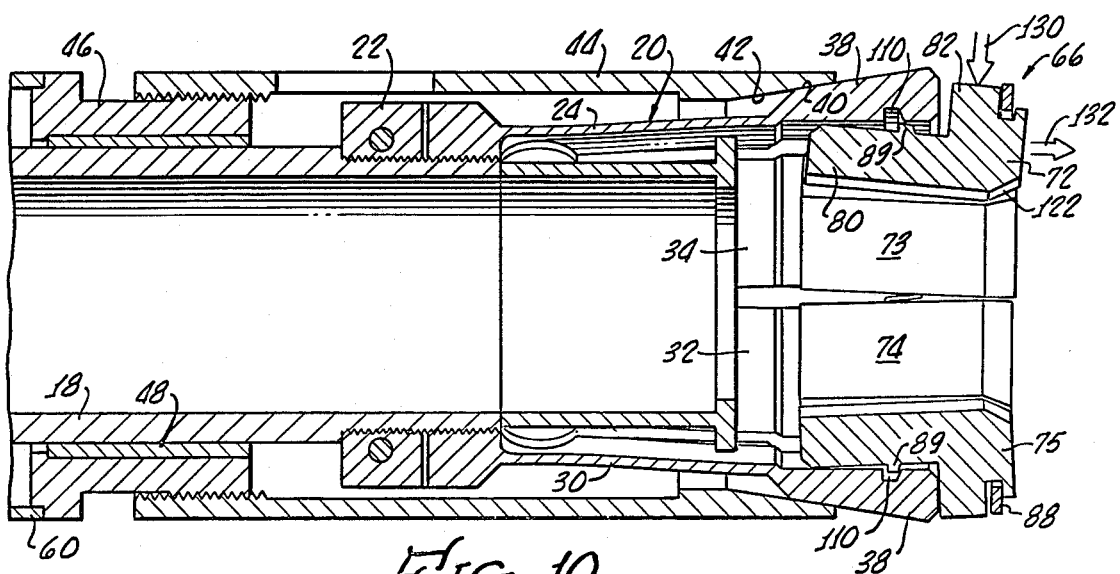
FIG. 10 is a view illustrating removal of a collet assembly.

Removal of the insert assembly is illustrated in FIGS. 9, 10 and 11. With the collet housing drive tube 44 in retracted position, the master collet fingers are free to expand radially to a degree sufficient to allow removal of the insert assembly. Thus with the parts in the position of FIG. 9, the insert segments are individually pressed radially inwardly, as indicated by arrow 130 of FIG. 10, and simultaneously pressed forwardly, as indicated by arrow 132 of FIG. 10, to thereby, one at a time, move a single segment radially inwardly and slightly forwardly. The radial inward motion is sufficient to retract the collet segment rib 89 from the recess 110 of the corresponding master collet finger head, and the forward motion moves the rib forwardly relative to the other collet segments a small distance to cause the outer surface of the rib 89 to bear against the inner surface or bore of the corresponding collet finger head so that this segment, still urged by the compression springs radially outwardly, can no longer have its rib enter into the recess 110. This operation is repeated individually for each of the segments of the assembly so that all segments are moved radially inwardly and axially outwardly to the relative position illustrated in FIG. 11. To speed up the process of removal, all of the insert segments may also be radially contracted simultaneously by the operator. With all of the collet segments in the position illustrated in FIG. 11, the entire assembly may be grasped with the operators fingers and simply withdrawn from the bore of the master collet fingers. In moving of an individual segment from the position of FIG. 9 to the position of FIG. 10, it may tilt relative to the remaining segments and will move forward slightly relative to the other segments. This relative axial and tilting motion is permitted by the relative sizing of the retaining ring 88 and recess 84, together with the flexibility of the compression springs.

The thickness of each identical segment of a single assembly, that is the radial dimension thereof between outer and inner surfaces of each segment, is chosen to enable use with a given sized pipe. Thus a number of different assemblies, each having different thicknesses of insert segments, are provided for each master collet.

There has been described a collet insert assembly that is readily and rapidly inserted and removed without the use of tools. The described collet may be inserted into the master collet assembly in about three to ten seconds, and may be removed in about five to fifteen seconds, all without the use of tools. The collet assembly may be stored as a unitary entity, all parts being held securely together by means of the compression springs and retaining ring. All of the segments of any given insert assembly are identical, thus facilitating manufacture and replacement of parts. The segments of the assembly are resiliently held together and allowed to expand to rest directly against the inner bore of the master collet fingers. The assembly employs compression springs captured in side faces of adjoining collet segments, thus leaving inner and outer surfaces entirely free, with no screws or other irregularities on the insert assembly bore that could impede passage of a pipe being inserted. When inserted in the master collet fingers, the assembly is normally expanded by the action of its compression springs to a degree sufficient to allow a pipe to be inserted or withdrawn without any drag along the surface of the pipe. Recess 84 of the insert segments is deep enough with respect to the inner diameter of the retaining ring 88 so that the segment assembly may be radially contracted by an amount sufficient to enable insertion and retraction of the assembly as a unit without dislodging the retaining ring from the recess in which it is captured. Nevertheless, the segments may be compressed still further radially to enable the retaining ring to be positioned within and removed from the recess. Thus the minimum outer diameter of the insert assembly along the outer surfaces 136 of the front walls 86 of the segments, when the collet assembly is in its maximum condition of radial compression, is just equal to but not greater than the inner diameter of the retaining ring 88, so that the latter may be snapped over the front wall of the segments into the recesses 84.

The foregoing detailed description is to be clearly understood as given by way of illustration and example only, the spirit and scope of this invention being limited solely by the appended claims:

What is claimed is:

1. A collet comprising:
   a master collet having a plurality of resilient collet fingers movable toward radially expanded and contracted positions, said fingers collectively defining an insert receiving bore,
   a removable self-contained insert assembly detachably secured in said master collet bore, said assembly being configured and arranged to be manually attachable to and removable from said bore without use of tools, said insert assembly comprising:
   a plurality of side by side insert segments having front and back ends,
   a plurality of resiliently compressible elements received between adjacent ones of said insert segments for urging said segments radially outwardly,
   a retainer ring encircling all of said segments adjacent said front ends thereof for limiting radial outward expansion of the segments and for holding the segments together in a unitary, self-contained assembly when the segments are removed from said insert receiving bore,
   said segments being configured to be manually squeezed together to a radially contracted position by radially inwardly directed pressure exerted at said front ends,
   a circumferential groove formed in said master collet fingers and opening into said insert receiving bore,
   a radially outwardly projecting rib on said inserts collectively, and extending circumferentially around said inserts intermediate said front and back ends, said rib being received in said circumferential grove, said rib having an outer diameter in said contracted position of said segments that is smaller than the diameter of said insert receiving bore when said collet fingers are in said expanded position thereof, said rib having an outer diameter in radially expanded position of said segments sufficient to position the rib in said circumferential groove when said collet fingers are in said expanded position thereof, said rib and groove being configured to enable said segments to be inwardly contracted by manually squeezing said forward ends, thereby withdrawing said rib from said groove and allowing the insert assembly to be substantially simultaneously grasped at said forward ends and pulled from said master collet bore, without use of tools.

2. The collet of claim 1 wherein said rib has an inwardly and forwardly sloping front surface and said groove has an inwardly and forwardly sloping front surface mating with said rib surface, said segments having radially outwardly projecting circumferentially extending lips at said front ends in contact with a front end of said collet fingers, said rib, groove and lip being configured to cause the collet fingers to be a snug fit between the forwardly sloping front surface of the rib and a rear surface of the lip.

3. The collet of claim 1 wherein said segment front ends include an outwardly opening circumferential retainer recess receiving said retainer ring, said retainer recess having an axial extent greater than the axial thickness of said retainer ring to allow each segment front end to be tilted radially inwardly relative to the collet fingers by a distance sufficient to withdraw the rib from the groove and thereby enable release of the segment from the master collet.

4. The collet of claim 1 wherein said compressible elements comprise a plurality of compression springs, said segments having mutually adjacent mating surfaces formed with pairs of mutually opposed and mutually registered spring receiving recesses, each of said springs being individually received in a respective pair of said recesses.

5. The collet of claim 1 wherein said segments each has a circumferentially extending outwardly opening recess receiving said ring, said ring having an axial dimension less than the axial dimension of said recess, to permit each segment to be tilted relative to the ring and to the other segments.

6. The collet of claim 5 wherein said recesses are defined in part by a circumferential front lip on each said segment, said lips collectively having an outer diameter not greater than the inner diameter of said ring, to thereby enable said ring to be moved over said lips into said recesses when said segments are radially contracted.

7. For use with a pipe bending machine of the type having a movable carriage for holding and positioning a pipe to be bent, and wherein pipes of different sizes are inserted into and removed from a pipe holding chuck on the carriage, an improved chuck comprising:
an adapter shaft fixed to the carriage at one end thereof and having a forward end,
a master collet having an enlarged rear end portion fixedly secured to the front portion of said adapter shaft, and having an enlarged master collet head, said head and rear portion being interconnected by a relatively thin axially extending master collet body, said master collet head and body being longitudinally separated into a number of master collet fingers, said head having a rearwardly and radially inwardly inclined outer drive surface, and having an inner bore for receiving a collet insert assembly,
a collet housing surrounding said master collet and having a forward end with an inner inclined surface mating with and engaging the inclined outer surface of said collet head,
a hollow drive shaft carried by said carriage for slidable axial motion and having a forward end thereof connected to said collet housing, whereby the collet housing may be axially reciprocated by motion of the drive shaft,
means on the carriage for axially driving the hollow drive shaft,
a removable self-contained insert assembly detachably secured in said master collet bore, said insert assembly comprising:
a plurality of side by side insert segments,
a plurality of compression springs respectively received between adjacent ones of said insert segments for urging said segments radially outwardly,
a retainer ring encircling all of said segments for limiting radial outward expansion of the segments and for holding the segments together,
a circumferential groove formed in said master collet head and opening into said bore, and
a radially outwardly projecting rib extending circumferentially around said inserts and received in said master collet head circumferential groove.

8. The apparatus of claim 7 wherein said insert assembly defines a pipe receiving bore having a diameter greater than the diameter of a pipe to be held in said pipe receiving bore, said segments being urged radially outwardly by said compression springs against said master collet inner bore.

9. The apparatus of claim 8 wherein each said segment has an outwardly opening retainer recess section, said sections collectively forming a circumferential retainer recess receiving said retainer ring, said recess having a depth sufficient to allow retention of said retainer ring in the recess during contraction of said insert assembly to a position in which the outer diameter of said rib is not greater than the diameter of said master collet bore, whereby the completely assembled insert may be radially contracted and inserted as a unit into said master collet bore.

10. For use with a pipe bending machine of the type having a movable carriage for holding and positioning a pipe to be bent, and wherein pipes of different sizes are inserted into and removed from a pipe holding chuck on the carriage, an improved chuck comprising:
a master collet having a rear end portion secured to said carriage and having an enlarged master collet head, said head and rear portion being interconnected by an axially extending master collet body, said master collet head and at least part of said body being longitudinally separated into a number of master collet fingers, said head having a rearwardly, and radially inwardly inclined outer drive surface, and having an inner bore or receiving a collet insert assembly,
a collet housing surrounding said master collet and having a forward end with an inner inclined surface mating with and engaging the inclined outer surface of said collet head, a drive shaft carried by said carriage for slidable axial motion and having a portion thereof connected to said collet housing, whereby the collet housing may be axially reciprocated by motion of the drive shaft, means on the carriage for axially driving the drive shaft, and a removable self-contained insert assembly detachably secured in said master collet bore, said insert assembly comprising:

a plurality of side by side insert segments, a plurality of resilient compressible elements respectively received between adjacent ones of said insert segments for urging said segments radially outwardly, a retainer ring encircling all of said segments for limiting radial outward expansion of the segments and for holding the segments together, a circumferential groove formed in said master collet head and opening into said bore, and a radially outwardly projecting rib extending circumferentially around said inserts and received in said master collet head circumferential groove.

11. The apparatus of claim 10 wherein said insert segments have front and back ends, wherein said rib is located substantially forward of said back end, and wherein said segments are configured to be manually squeezed together at the front ends thereof into a retracted position in which said rib is manually withdrawn from said groove to allow the insert assembly to be grasped to a front end thereof and pulled from said master collet.

12. The apparatus of claim 11 wherein said rib has an inwardly and forwardly sloping front surface and said groove has an inwardly and forwardly sloping front surface mating with said rib surface, said segments having radially outwardly projecting circumferentially extending lips at said front ends, said lips having a rear surface in contact with a front end of said collet fingers, said rib, groove and lip being configured to cause the collet fingers to be a snug fit between the forwardly sloping front surface of the rib and said rear surface of the lip.

13. The apparatus of claim 11 wherein said segment front ends include an outwardly opening circumferential retainer recess that receives said retainer ring, said retainer recess having an axial extent greater than the axial thickness of said retainer ring to allow each segment front end to be tilted radially inwardly relative to the collet fingers by a distance sufficient to withdraw the rib from the groove and thereby enable release of the segment from the master collet.

* * * * *